United States Patent [19]

Doty

[11] Patent Number: 4,558,887

[45] Date of Patent: Dec. 17, 1985

[54] SNUBBING SLIP RING

[75] Inventor: Gerald A. Doty, Crown Point, Ind.

[73] Assignee: Gateway Industries, Inc., Hazel Crest, Ill.

[21] Appl. No.: 529,093

[22] Filed: Sep. 2, 1983

[51] Int. Cl.$^4$ .................................... B60R 21/10
[52] U.S. Cl. ............................ 280/802; 280/808; 297/469
[58] Field of Search ............... 280/801, 802, 803, 804, 280/808; 24/136 R, 68.5 B, 68 A, 171, 196; 297/468, 469

[56] References Cited

U.S. PATENT DOCUMENTS

| | | | |
|---|---|---|---|
| 2,377,287 | 5/1945 | White et al. | 24/171 |
| 3,915,473 | 10/1975 | Lindblad | 280/804 |
| 4,364,584 | 12/1982 | Rogers, Jr. et al. | 280/802 |

Primary Examiner—Joseph F. Peters, Jr.
Assistant Examiner—Kenneth R. Rice
Attorney, Agent, or Firm—Fitch, Even, Tabin & Flannery

[57] ABSTRACT

In a passive restraint seatbelt assembly, a first belt, attached to the interior of the vehicle through an inertia sensitive locking retractor reel, and a fixed length slideable belt are joined by a snubbing slip ring which allows free sliding of the slideable belt therethrough in normal conditions but frictionally restrains the slideable belt in emergency situations. The snubbing slip ring is formed with a snubbing bar slideable within a housing by a reverse bend portion of a looped end of the first belt. During tension of the belts, the reverse bend tends to straighten out forcing the snubbing bar against the slideable belt.

5 Claims, 4 Drawing Figures

U.S. Patent   Dec. 17, 1985   4,558,887
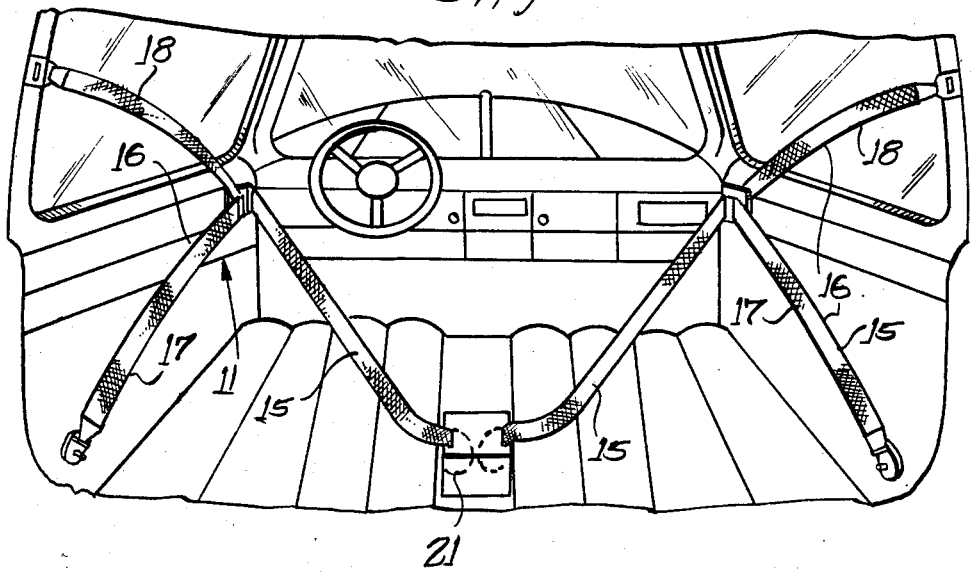
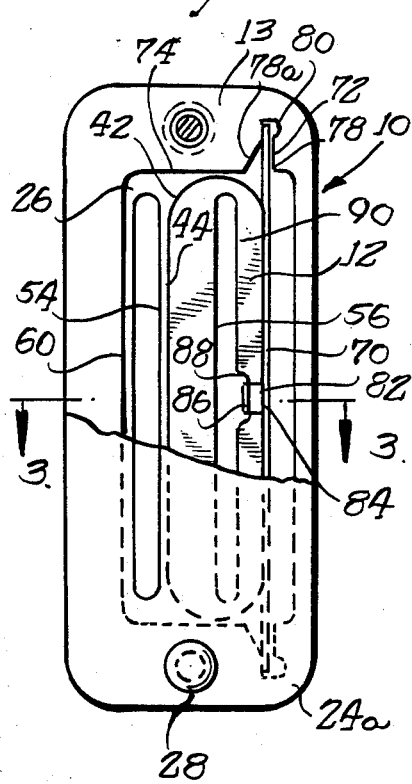
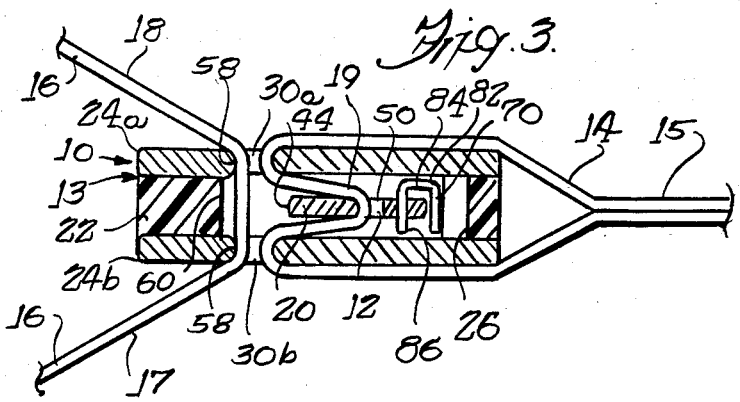
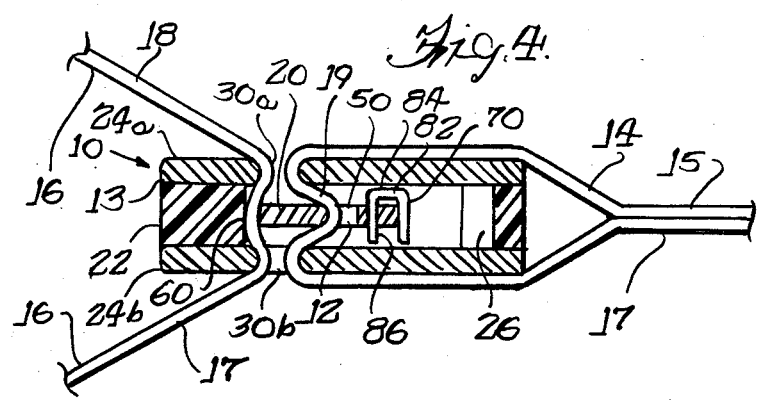

SNUBBING SLIP RING

The present invention relates to seatbelt assemblies and more particularly to slip rings for passive restraint seatbelt assemblies.

It is required by law in the United States and other countries that vehicles be provided with seatbelt assemblies having portions which restrain both the lap and the shoulder. Such seatbelts, while proven safety factors, provide no protection at all if, as commonly happens, the rider does not use the seatbelts. Accordingly, the need is recognized for passive restraint seatbelt assemblies whereby the user is provided with restraint without any overt act on his part. U.S. Pat. No. 3,915,473 is illustrative of a passive restraint seatbelt assembly which surrounds the passenger when he enters the vehicle. One arrangement for such a passive restraint mechanism involves having an adjustable length belt attached through a retractor reel to the interior of the vehicle and a slideable belt affixed at the upper and lower portions of the door. The belts are joined by a slip ring which permits simultaneous adjustment of the lap and shoulder restraints, the lap restraint including the adjustable length belt and that portion of the slideable belt below the slip ring and the shoulder restraint being the upper portion of the slideable belt.

Seatbelts commonly in use in present day vehicles have lap and shoulder restraints which permit generally free movement of the passenger within his seat during non-emergency situations but which restrain the passenger in emergency situations such as rapid deceleration. For user convenience and to promote user acceptance of passive restraint belts it would be desirable that a slip ring be provided which permits free sliding of the slideable belt through the slip ring in non-emergency situations to allow free passenger movement.

Accordingly, it is a primary object of the present invention to provide a passive restraint seatbelt assembly having a first belt attached to the interior of the vehicle, a slideable belt attached to the door of the vehicle, and a slip ring joining the belts which, during normal conditions, permits free sliding of the slideable belt therethrough but which, during rapid deceleration of the vehicle, prevents sliding of the slideable belt.

These and other objects of the invention will become more clear from the following description, reference being made to the accompanying drawings in which:

FIG. 1 is a perspective view of the passenger compartment of a vehicle having a passive restraint assembly embodying various features of the present invention;

FIG. 2 is a plan view of the snubbing slip ring for the passive restraint assembly illustrated in FIG. 1;

FIG. 3 is a cross-sectional view of the slip ring of FIG. 2 through which the adjustable and slideable belts are passed and in which the snubbing bar is in its release position;

FIG. 4 is a cross-sectional view similar to that of FIG. 3 in which the snubbing bar is slid forward into its snubbing position.

In accordance with the present invention, a snubbing slip ring 10 in a passive restraint seatbelt assembly 11 is formed with a slideable snubbing bar 12 slideable within a housing 13 by a looped end 14 of a first adjustable length belt 15 to snub a slideable belt 16 to limit transfer of the slideable belt between lap and shoulder belt portions 17, 18. The looped belt end 14 has a reverse bend portion 19 behind a portion 20 of the snubbing bar 12 which tends to straighten during tension of the belts and force the snubbing bar against the slideable belt 16 to snub the same.

So that the invention will be more fully understood, the snubbing slip ring 10 and the passive restraint seatbelt assembly 11 will now be described in greater detail.

As best seen in FIG. 1 the adjustable length belt 15 is attached at its upper end to the snubbing slip ring 10 by its looped belt end 14 and at its lower end to the interior of the vehicle through an inertia sensitive locking reel retractor 21 which allows free extension of the adjustable length belt 15 in normal conditions but locks to prevent extension thereof in emergency situations such as sudden rapid deceleration of the vehicle. The fixed-length slideable belt 16 is attached at its upper and lower ends to the door of the vehicle. The lap belt portion 17 of the assembly 11 includes that portion of the slideable belt 16 below the slip ring 10. The shoulder belt portion 18 of the assembly 11 is that portion of the slideable belt 16 above the slip ring 10. During normal conditions, the free retraction of the belt 15 from the reel and the free sliding of the slideable belt 16 through the slip ring 10 allows the user to move freely in his seat. During emergency situations, the retractor reel 21 locks to prevent retraction of the adjustable length belt 15 and the snubbing slip ring 10 frictionally restrains the slideable belt 16 so that the lap and shoulder portions 17, 18 are strictly defined and provide restraint to the lower and upper body.

While the slip ring 10 is operable in any direction, for ease of discussion the slideable belt 16 will be described as being forward of the adjustable length belt 15. The vertical orientation of the slip ring 10 referred to herein will be that of FIG. 2.

The housing 13 of the slip ring 10 is formed of a flat body member 22 sandwiched between an upper and a lower flat plate 24a and 24b, the peripheries of which are substantially matched to the body member, being rectangular with rounded corners. The body member 22, which may be fabricated from a suitably durable polymer, has a generally rectangular opening extending therethrough to provide an internal cavity 26 between the plates 24. Aligned orifices extend through the plates 24 and the body member 22 at each end to accommodate a pair of rivets 28 (FIG. 2) which hold the plates firmly against the body member.

The upper and lower plates 24a and 24b, which are preferably made of metal, have, respectively, an elongated upper and lower slot 30a, 30b disposed forward of their longitudinal centerline, the slots in the assembled slip ring 10 being mutually aligned and positioned over the cavity 26 to provide a passage through which the belts 15, 16 are threaded.

The snubbing bar 12, which is disposed within the cavity 26, is a flat elongated member which extends substantially the length of the cavity so that its curved ends 42 locate along the ends of the cavity. The snubbing bar 12 is sufficiently narrow that it may be laterally moved between its backward release position (FIG. 3) and its forward snubbing position (FIG. 4), and preferably the snubbing bar is proportioned so that, in its release position, its front edge 44 is disposed completely behind the slots 30 to provide clear passage of the slideable belt 16 passing through the slots.

Generally, through the longitudinal centerline of the snubbing bar 12 is an elongated aperture 50 of sufficient length to accommodate threading of the looped end 14 therethrough. The snubbing bar 12, which preferably is metal, is sufficiently thin relative to the body member 22 to allow the portion of the looped belt end 14 in the cavity 26 to pass along both sides of the snubbing bar between the plates 24 to provide the reverse bend 19 which winds along the back edges 54 (FIG. 2) of the upper and lower plate slots 30a, 30b and around the front edge 56 of the aperture 50 disposed therebehind.

The slideable belt 16 passes directly through the aligned plate slots 30, and when the snubbing bar 12 is in its backward release position, the slideable belt contacts only the front edges 58 of the plate slots 30, the front edge 60 of the cavity 26 being spaced slightly thereinfront. When the reel 21 is locked during rapid decelleration and the adjustable length belt 15 is placed under tension by the forwaard motion of the user, the tension on the looped belt end 14 tends to straighten the reverse bend 19 to push against the front edge 56 of the aperture 50 and move the snubbing bar 12 forward until its front edge 44 bears against and frictionally restrains sliding of the slideable belt 16. The amount of restraint provided by the snubbing slip ring 10 will depend in part on the force with which the snubbing bar 12 bears against the slideable belt 16. If the snubbing bar 12 bears lightly against the slideable belt 16, the slideable belt will be pushed into that area of the cavity 26 forward of the slots 30 but will be spaced from the front edge 60 of the cavity 26 so that sliding of the slideable belt is slowed but not stopped. If the snubbing bar 12 is moved forward by sufficient belt tension to push the slideable belt 16 against the front edge 60 of the cavity 26, movement of the slideable belt 16 is substantially halted. Thus, the snubbing slip ring 10 provides a mild restraint when only a mild restraint is necessary but firmly restrains the user in severe emergencies.

Biasing means, in the form of a flat leaf spring 70 of resiliently deformable metal, retains the snubbing bar 12 in its release position during normal conditions. Extensions 72 (FIG. 2) of the body member opening extend outward from the short edges 74 of the cavity 26 to hold the ends of the leaf spring 70 which is longer than the cavity 26. The extensions 72, which are disposed toward the back of the cavity 26, each have a flat back face 78 orthogonal to the short cavity edge 74, a front edge 78A which angles from the short cavity edge backwards towards the ends of the straight edge, and a rounded end portion 80. A bracket 82 consisting of a horizontal panel 84, extending from the center of the upper edge of the spring 70, and a generally vertical panel 86, extending downward from the end of the horizontal panel, links the spring 70 to the snubbing bar 12. The vertical panel 86 locates against the back edge of a small indentation 88 of the back edge 90 of the aperture 50 so that under normal conditions, with the spring 70 extended flat against the straight edges 78 of the extensions 72, the snubbing bar 12 is maintained in its backward release position. When tension on the adjustable length belt 15 pulls the snubbing bar 12 forward to its snubbing position, the center of the spring 70 is bowed forward and the ends of the spring extend along the front angled edges 78A of the extensions 72 and back into the circular portions 80 thereof. The spring 70 is selected with a resistance to deformation which maintains the snubbing bar 12 in the release position when the adjustable length belt 15 is subjected only to the normal tension provided by the unlocked retractor reel 21, yet allows the snubbing bar 12 to move to its snubbing position when the adjustable length belt is under locked-reel tension.

Several advantages of the invention may now be more fully appreciated. The slip ring 10, during normal conditions, provides substantially free sliding of the slideable belt 16 to allow continual adjustment of the seatbelt assembly 11 as the user moves about in his seat for his comfort and convenience. While the slip ring 10 provides a strong restraint when a strong restraint is needed, it provides only a mild restaint when only a mild restraint is needed so that the user is not subjected unnecessarily to the jolting which results when the slip ring locks completely.

The slip ring 10 is designed simply with few moving parts and, as under normal conditions the parts will be nonmoving, the expected reliable life of the slip ring should greatly exceed the expected life of the vehicle. Furthermore, the flat profile and light weight of the slip ring 10 allow it to be worn comfortably.

While the invention has been described in terms of a preferred embodiment, modifications obvious to one skilled in the art may be made without departing from the scope of the invention. For example, the ring may be made without a biasing spring since the slideable belt should not be significantly restrained even if a free floating snubbing bar loosely contacts it. The slip ring could be designed with the upper and lower plates each having separate slots for each belt.

Various features of the invention are set forth in the following claims.

What is claimed is:

1. A passive restraint seatbelt assembly having an adjustable length belt linked at one end to a vehicle and having a folded loop at its free end, a fixed length slideable belt linked at each end to a vehicle, and a snubbing slip ring through which said folded loop is threaded and through which said slideable belt is threaded for sliding therethrough; said snubbing slip ring comprising:
   a housing having upper and lower slot means;
   a snubbing bar disposed in said housing for movement between a release portion whereat said slideable belt slides freely through said upper and lower slot means, and a snubbing position whereat said snubbing bar abuts and frictionally restrains said slideable belt, said folded loop folding along said upper and lower slot means and along a portion of said snubbing bar which is disposed behind said upper and lower slot means in said release position so that tension on said adjustable length belt straightens that folded loop between said upper and lower slot means and pushes said snubbing bar forward into said snubbing position.

2. An assembly according to claim 1 wherein an inertia sensitive locking retractor reel is connected to said adjustable length belt portion to lock the same preventing extension of said adjustable length belt from said reel during rapid decelleration of said vehicle.

3. An assembly according to claim 2 wherein a biasing means retains said snubbing bar in said release position when said belts are not in tension.

4. An assembly according to claim 3 wherein said biasing means is a leaf spring.

5. An assembly according to claim 1 wherein an aperture of said snubbing bar receives said folded loop therethrough.

* * * * *